(12) United States Patent
Wu

(10) Patent No.: US 7,321,490 B2
(45) Date of Patent: Jan. 22, 2008

(54) CONNECTING APPARATUS OF NOTEBOOK COMPUTER DISPLAY CARD

(75) Inventor: Kang Wu, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 449 days.

(21) Appl. No.: 10/983,594

(22) Filed: Nov. 9, 2004

(65) Prior Publication Data

US 2005/0128701 A1    Jun. 16, 2005

(30) Foreign Application Priority Data

Dec. 15, 2003   (TW) .............................. 92221951 U

(51) Int. Cl.
    *G06F 1/20* (2006.01)
(52) U.S. Cl. ...................................... 361/687; 361/683
(58) Field of Classification Search ................. 361/687
    See application file for complete search history.

(56) References Cited

U.S. PATENT DOCUMENTS

| | | | | |
|---|---|---|---|---|
| 5,475,563 A | * | 12/1995 | Donahoe et al. ............ | 361/695 |
| 5,734,550 A | * | 3/1998 | Penniman et al. .......... | 361/687 |
| 5,737,187 A | * | 4/1998 | Nguyen et al. ............. | 361/704 |
| 5,953,211 A | * | 9/1999 | Donahoe et al. ............ | 361/704 |
| 6,134,104 A | * | 10/2000 | Mohi et al. ................. | 361/683 |
| 6,256,192 B1 | * | 7/2001 | Shannon ...................... | 361/683 |
| 6,567,269 B2 | * | 5/2003 | Homer et al. ............... | 361/700 |
| 7,102,592 B2 | * | 9/2006 | Huang et al. ................ | 345/1.1 |
| 2001/0040789 A1 | * | 11/2001 | Tanaka et al. .............. | 361/687 |
| 2004/0042160 A1 | * | 3/2004 | Yang et al. ................. | 361/681 |

* cited by examiner

*Primary Examiner*—Lisa Lea-Edmonds
(74) *Attorney, Agent, or Firm*—Rabin & Berdo, PC

(57) ABSTRACT

A connecting apparatus of a notebook computer display card is described. The connecting apparatus has a motherboard and a dual in-line module slot. The dual in-line module slot for coupling to a notebook computer display card is disposed on a surface of the motherboard. The socket has an insertion opening parallel to the surface of the motherboard so that the display card and the motherboard are parallel to each other after the display card is assembled on the motherboard. The connecting apparatus further has a heat sink device to reduce a working temperature of the display card. The heat sink device may be configured between the motherboard and the display card. Alternatively, the heat sink device may be disposed on an outside of the display card so that the display card is configured between the heat sink device and the motherboard.

16 Claims, 2 Drawing Sheets

CONNECTING APPARATUS OF NOTEBOOK COMPUTER DISPLAY CARD

RELATED APPLICATIONS

The present application is based on, and claims priority from, Taiwan Application Serial Number 92221951, filed on Dec. 15, 2003, the disclosure of which is hereby incorporated by reference herein in its entirety.

BACKGROUND

1. Field of the Invention

The present invention relates to a connecting apparatus for coupling a display card to a motherboard, and more particularly to a notebook display card connecting apparatus for coupling a notebook computer display card to a notebook computer motherboard.

2. Description of Related Art

Due to rapid developments in electrical technologies and portable computer applications, notebook computers are gradually becoming smaller and lighter with each passing day. Notebooks with a portable outline size and weight create an enormous increase in processing speed, and therefore notebook computers have become a popular electrical product.

Compared with a same level desktop computer, the notebook computer is more expensively designed in a longer design cycle. Therefore, a conventional notebook computer normally selects an on-board graphic chip for providing a stable working environment with lower manufacturing costs. Accordingly, the on-board graphic chips are usually used in conventional notebook computers. The on-board graphic chips cannot simply be exchanged or detached to improve the graphic capacity thereof.

Furthermore, a conventional notebook computer generally cannot provide the same graphic capacities with that of a desktop computer; especially for the 3D graphic capacity thereof. For improving the graphic capacity of the notebook computer, some conventional notebook computers utilize modular display cards to reveal the image with a suitable display resolution. However, an interior space of the notebook computer is limited so that the notebook computer cannot provide enough space to insert the display card vertically into a socket on the motherboard as well as the display card installed on the motherboard of the desktop computer.

Accordingly, a board-to-board connector module for coupling the display card to the motherboard has been developed. The board-to-board connector module has a plug connector and a socket connector respectively connected with the display card and the motherboard of the notebook computer. The connecting directions of the plug connector and the socket connector are both perpendicular to the surfaces of the motherboard and the display card. Therefore, the motherboard and the display card can be combined together parallel to each other so that the display card can be installed in the limited interior space of the notebook computer.

However, the plug connector and the socket connector are both perpendicular to the surfaces of the motherboard and the display card so that solder flux and solder splatter can easily attach to the contact terminals of the plug connector and the socket connector. Hence, the notebook computer with the board-to-board connector module can suffer from a poor contact problem and a poor signal transmission problem. Cleaning the board-to-board connector module is also difficult; the yield rate of the notebook computers is thus reduced and the manufacturing cost thereof increased.

SUMMARY

It is an objective of the present invention to provide a connecting apparatus for a notebook computer display card to install the notebook computer display card parallel to a notebook motherboard so as to be able to replace the display card according to a practical requirement.

It is another objective of the present invention to provide a connecting apparatus for a notebook computer display card, with an insertion opening of the connecting apparatus parallel to a motherboard, so as to reduce the probability of flux and solder splatter attaching to the contact terminals thereof and enhance the assembly yield rate of notebook computers.

It is yet another objective of the present invention to provide a connecting apparatus with a heat sink device for a notebook computer display card, and the heat sink device is configured on one side of the notebook computer display card to reduce a working temperature thereof and allow convenient switching of the notebook computer display card.

To accomplish the above objectives, the present invention provides a connecting apparatus for a notebook computer display card. The connecting apparatus includes a motherboard and a dual in-line module slot. The motherboard is installed in a notebook computer and the dual in-line module slot is installed on the motherboard. The dual in-line module slot couples to a notebook computer display card and an insertion opening of the dual in-line module slot is parallel to the motherboard so that the notebook computer display card installed in the dual in-line module slot is parallel to the motherboard.

The dual in-line module slot includes a small outline module slot. The small outline module slot can be coupled to the notebook computer display card and then be pressed toward the motherboard so that the notebook computer display card is parallel to the motherboard.

The connecting apparatus further includes a heat sink device to reduce a working temperature of the notebook computer display card. The heat sink device can be configured between the motherboard and the notebook computer display card, or an outside of the notebook computer display card, so that the notebook computer display card is configured between the motherboard and the heat sink device. The notebook computer display card further includes a plurality of corresponding golden fingers for coupling to the dual in-line module slot.

The connecting apparatus according to the present invention allows a display card to be easily and effectively installed, switched and removed from a notebook computer. In addition, the connecting apparatus according to the present invention not only allows quick installation and removal of the notebook computer display card in the notebook computer but also allows maintenance of a suitable working temperature for the notebook computer display card.

BRIEF DESCRIPTION OF THE DRAWINGS

The foregoing aspects and many of the attendant advantages of this invention are more readily appreciated as the same becomes better understood by reference to the following detailed description, when taken in conjunction with the accompanying drawings, wherein.

DESCRIPTION OF THE PREFERRED EMBODIMENTS

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
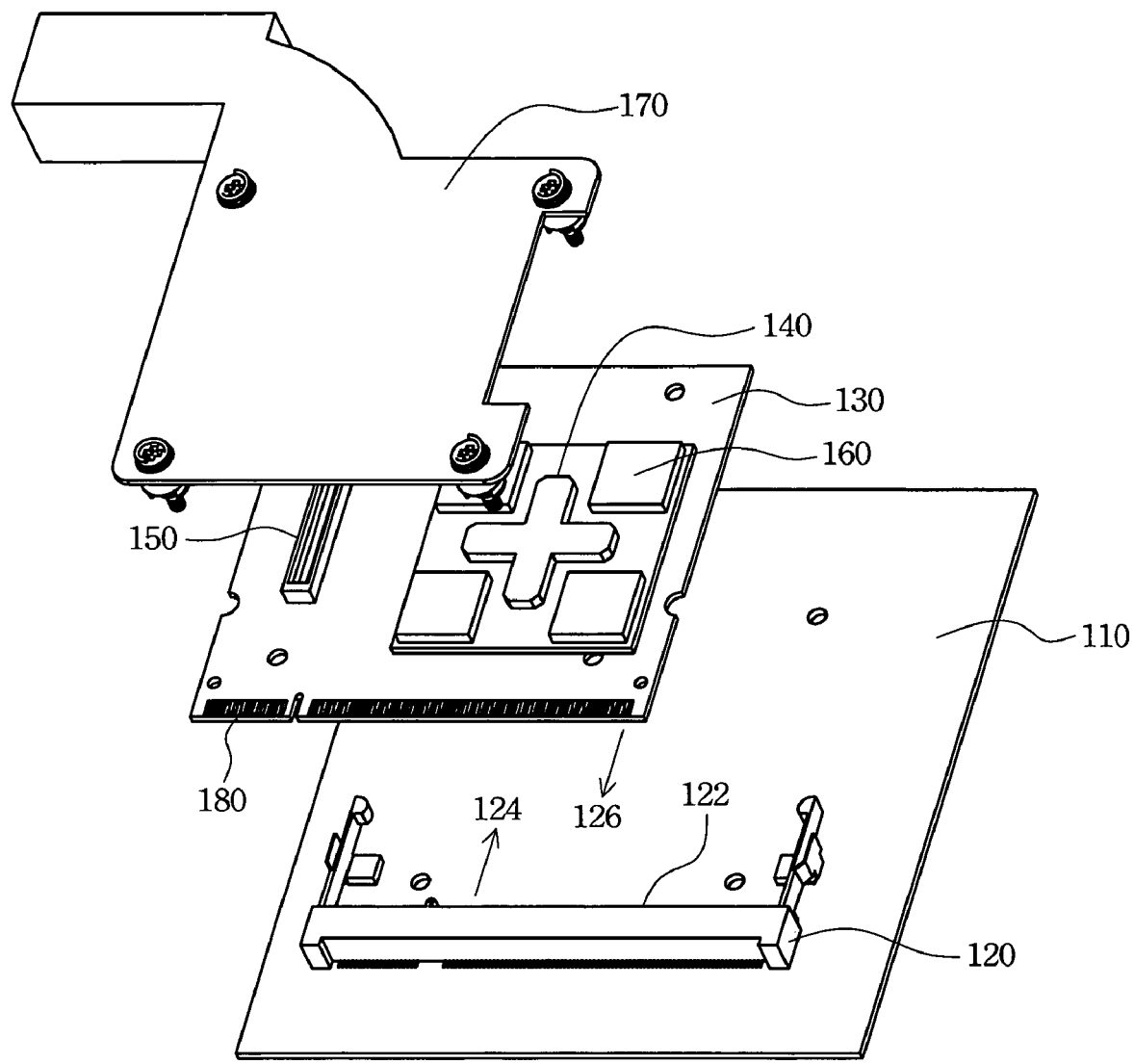
FIG. 1 is a preferred embodiment of a connecting apparatus of a notebook computer display card according to the present invention.

FIG. 1 is a preferred embodiment of a connecting apparatus of a notebook computer display card according to the present invention. The connecting apparatus of the notebook computer display card includes a motherboard 110, a dual in-line module slot 120, including a dual in-line memory module (DIMM) slot. The dual in-line module slot 120 is disposed on a surface of the motherboard 110, and an insertion opening 122 thereof is parallel to the surface of the motherboard 110.

When a display card 130 is coupled to the connecting apparatus, golden fingers 180, corresponding to the dual in-line module slot 120, of the display card 130 are first inserted into the insertion opening 122 parallel to the surface of the motherboard 110. Because the display card 130 is parallel to the motherboard 110, the connecting apparatus is suitable for installation of the display card 130 on the motherboard 110 of a notebook computer.

The direction 124 of the insertion opening 122 of the dual in-line module slot 120 is parallel to the surface of the motherboard 110; that is to say, an installation direction 126 of the display card 130 is parallel to the motherboard 110. Therefore, the display card 130 and the dual in-line module slot 120 for coupling to the display card 130 are both parallel to the motherboard 110. When electrical parts and the dual in-line module slot 120 are being soldered on the motherboard 110 in a soldering pot or a reflow furnace, the contact terminals of the dual in-line module slot 120 are protected from solder flux and solder splatter by a shell of the dual in-line module slot 120, because the flux and solder splatter attach contact terminals of the dual in-line module slot 120 difficultly. Hence, the interior of the dual in-line module slot 120 is remained clean, and the yield rate and quality for installing the display card 130 on the motherboard 110 can be improved. Accordingly, the manufacturing cost of the notebook computers is reduced.

The DIMM socket 120 preferably includes a 168-pin socket for coupling to corresponding golden fingers on a printed circuit board of a memory module, for example, a Synchronous Dynamic Random Access Memory (SDRAM) module, or a Double Data Rate SDRAM (DDR SDRAM) module. Since the dual in-line module slot 120 is used to couple to the SDRAM module or a DDR SDRAM module, the dual in-line module slot 120 can provide sufficient transmission rate and electrical properties for the display card 130 when the dual in-line module slot 120 is coupled to the display card 130 with a high speed graphic chip.

The dual in-line module slot 120 can also use a small outline module slot, such as a small outline DIMM (SO DIMM) slot. An insertion opening of small outline module slot 120 can be rotated and lifted upward when the display card 130 is being coupled to the small outline module slot, and then the small outline module slot and the display card 130 are pressed and rotated back toward the motherboard 110 so as to be parallel to the motherboard 110. The SO DIMM socket is particularly suitable for coupling the display card 130 in a notebook computer with a small and narrow interior space. The DIMM socket 120 according to the present invention is not limited to 168 pins, and the pin quantity of the DIMM socket 120 is defined according to the practical function requirement of the display card 130.

The connecting apparatus of a notebook computer display card according to the present invention further includes a heat sink device 170. In the preferred embodiment, the heat sink device 170 is configured on an outside of the display card 130. That is, after the display card 130 is installed on the motherboard 110, the heat sink device 170 is then fixed thereon. The display card 130 includes a graphic chip 140, at least one memory 160, and a display cable socket 150. The heat dissipation problem of the display card 130 is increasingly serious because the graphic chip 140 is increasingly powerful. Therefore, the connecting apparatus of the notebook computer display card according to the present invention further utilizes the heat sink device 170 to remove heat generated by the display card 130. Therefore, a working temperature of the display card 130 is effectively reduced. The display cable socket 150 is utilized to couple a display cable for revealing images on the display module of the notebook computer.

Figure 2:
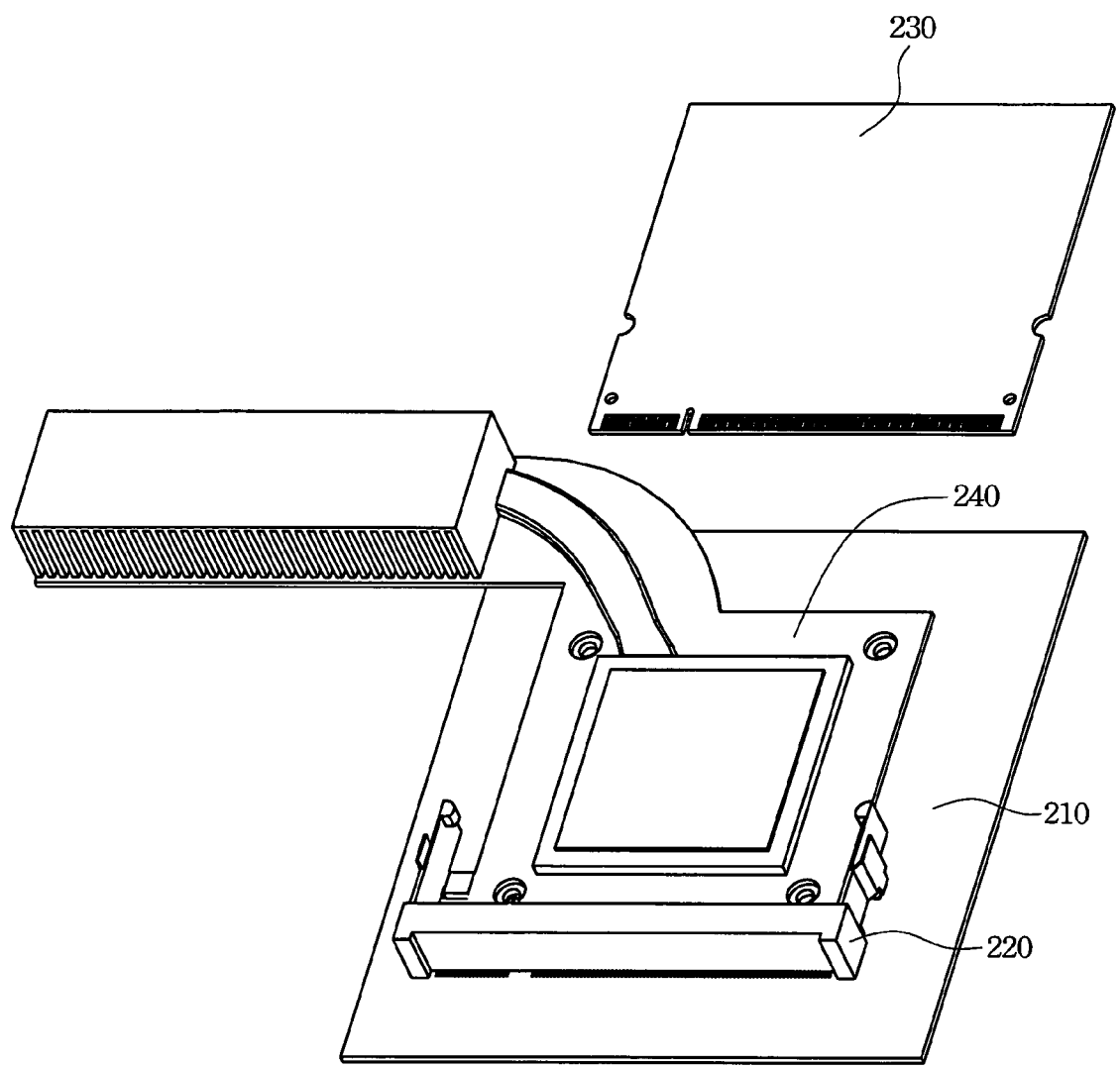
FIG. 2 is another preferred embodiment of a connecting apparatus of a notebook computer display card according to the present invention.

FIG. 2 is another preferred embodiment of a connecting apparatus of a notebook computer display card according to the present invention. In this preferred embodiment, the connecting apparatus of a notebook computer display card includes a motherboard 210, and a DIMM socket 220 thereon for coupling to a display card 230 parallel to the motherboard 210. This preferred embodiment also includes a heat sink device 240 therein. However, the heat sink device 240 is installed between the display card 230 and the motherboard 210. That is, the heat sink device 240 is first coupled to the motherboard 210, and then the display card 230 is coupled to the DIMM socket 220 on the motherboard 210.

With this preferred embodiment, a user can easily and conveniently install or switch the display card 230 in a notebook computer. Accordingly, a convenient installation ability for assembling the display card 230 is achieved, and a working temperature of the display card 230 is also reduced. The display card 230 therefore performs more stably.

The connecting apparatus of a notebook computer display card according to the present invention utilizes the DIMM socket to improve the connection quality and yield rate of the display card installed on the motherboard of the notebook computer. Accordingly, the manufacturing cost of the notebook computer is reduced and the installation and switch of the display card are faster and more convenient. The connecting apparatus of the notebook computer display card further cooperates with the heat sink device thereon to reduce the working temperature of the display card effectively, and enhance the stability of the display card furthermore.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A connecting apparatus for connecting a notebook computer display card to a notebook computer, comprising:
   a motherboard configured in the notebook computer;
   a dual in-line module slot configured on a surface of the motherboard to be coupled to the notebook computer display card, the dual in-line module slot including an insertion opening, wherein the direction of the insertion opening of the dual in-line module slot is parallel to the surface of the motherboard and the connected notebook computer display card is parallel to the motherboard.

2. The connecting apparatus of a notebook computer display card of claim 1, wherein the dual in-line module slot comprises a dual in-line memory module (DIMM) slot.

3. The connecting apparatus of a notebook computer display card of claim 1, wherein the dual in-line module slot comprises a small outline dual in-line memory module (SO DIMM) socket.

4. The connecting apparatus of a notebook computer display card of claim 1, further comprising a heat sink device to reduce a working temperature of the notebook computer display card.

5. The connecting apparatus of a notebook computer display card of claim 4, wherein the heat sink device is configured between the motherboard and the notebook computer display card.

6. The connecting apparatus of a notebook computer display card of claim 4, wherein the heat sink device is configured on an outside of the notebook computer display card so that the notebook computer display card is configured between the motherboard and the heat sink device.

7. The connecting apparatus of a notebook computer display card of claim 1, wherein the dual in-line module slot is coupled to a plurality of corresponding golden fingers of the notebook computer display card.

8. A notebook computer, comprising:
   a motherboard;
   a dual in-line module slot configured on the motherboard, wherein the dual in-line module slot comprises an insertion opening parallel to the motherboard; and
   a notebook computer display card coupled to the dual in-line module slot, wherein the coupled notebook computer display card is parallel to the motherboard.

9. The notebook computer of claim 8, wherein the, dual in-line memory module socket comprises a small outline dual in-line memory module (SO DIMM) socket, and wherein the notebook computer display card is inserted into the insertion opening of the small outline dual in-line memory module socket and is pressed toward the motherboard so that the notebook computer display card is parallel to the motherboard.

10. The connecting apparatus of a notebook computer display card of claim 8, wherein the dual in-line module slot comprises a dual in-line memory module (DIMM) slot.

11. The notebook computer of claim 8, wherein the notebook computer further comprises a heat sink device to reduce a working temperature of the notebook computer display card.

12. The notebook computer of claim 11, wherein the heat sink device is configured between the motherboard and the notebook computer display card.

13. The notebook computer of claim 11, wherein the heat sink device is configured on an outside of the notebook computer display card so that the notebook computer display card is configured between the motherboard and the heat sink device.

14. The notebook computer of claim 11, wherein the notebook computer display card further comprises a graphic chip coupled to the heat sink device so that a heat generated by the graphic chip is removed from the notebook computer by the heat sink device.

15. The notebook computer of claim 14, wherein the notebook computer display card further comprises a plurality of memories around the graphic chip.

16. The notebook computer of claim 8, wherein the dual in-line module slot couples to a plurality of corresponding golden fingers of the notebook computer display card.

* * * * *